L. J. FARLAND AND L. F. ROBERT.
ROD PACKING.
APPLICATION FILED MAY 6, 1918.
1,307,901.
Patented June 24, 1919.
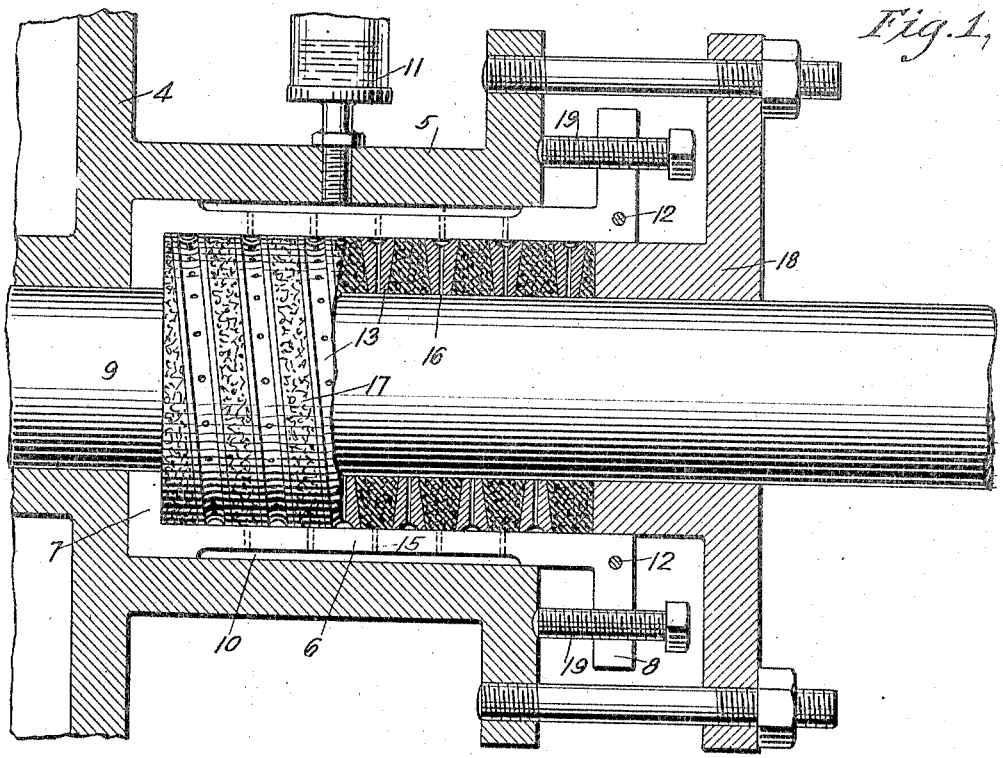
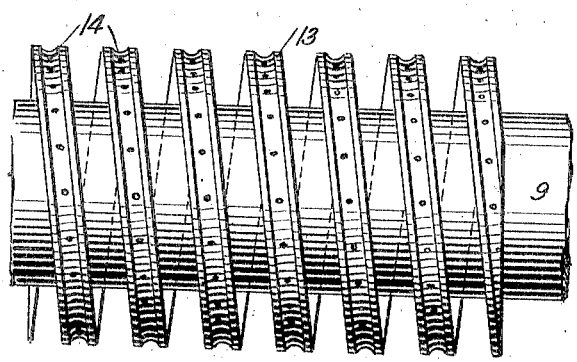
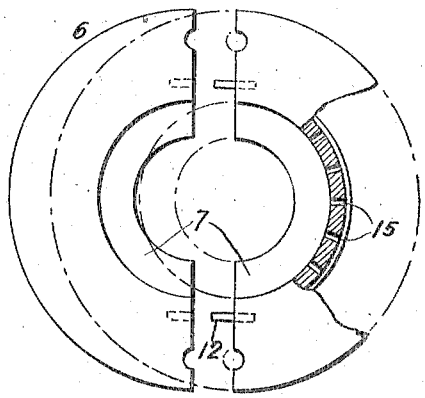
WITNESSES
INVENTORS
L. J. Farland
L. F. Robert
BY
ATTORNEYS

UNITED STATES PATENT OFFICE.

LOUIS J. FARLAND AND LOUIS F. ROBERT, OF AU SABLE FORKS, NEW YORK.

ROD-PACKING.

1,307,901.  Specification of Letters Patent.  Patented June 24, 1919.

Application filed May 6, 1918. Serial No. 232,339.

*To all whom it may concern:*

Be it known that we, LOUIS J. FARLAND and LOUIS F. ROBERT, both citizens of the United States, and both residents of Au Sable Forks, in the county of Essex and State of New York, have invented Rod-Packing, of which the following is a full, clear, and exact description.

Our invention relates to packing characterized by the provision of packing and packing supporting members which alternate and in which the supporting means help to lubricate the packing.

An object of the invention is to provide a simple and efficient packing for rods, whether reciprocating or rotating.

Another object of the invention is to provide a packing which can be easily and quickly removed and replaced.

With the above and other objects in view, the nature of which will more fully appear as the description proceeds, the invention consists in the novel construction, combination and arrangement of parts, as herein fully described, illustrated and claimed.

In the accompanying drawings forming part of the application, similar characters of reference indicate corresponding parts in all the views.

Figure 1 is a vertical longitudinal section through a packing embodying our invention, a portion of the packing being left in elevation;

Fig. 2 is an elevation of the helical spring which forms the supporting means of the packing and helps to lubricate the packing, and Fig. 3 is an end elevation of the split removable packing carrier forming the stuffing box, a portion of which is broken out to show the details of construction.

Referring to the drawings, 4 is the cylinder head having an extension 5 for receiving the stuffing box 6 which is formed of semi-cylindrical sections, having a bottom 7 at one end and flanges 8 at the other end. The bottom of the stuffing box 6 is apertured to fit snugly a rod or shaft 9 which passes into the cylinder. The stuffing box 6 has its outer diameter reduced between the ends to form an oil chamber 10 within the extension 5 into which lubricant may be supplied by suitable means 11 secured to the extension 5. To better centralize the stuffing box guide pins 12 are provided for the sections of the stuffing box.

A helical member 13 is accommodated within the stuffing box, the cross section of the thread of the helical member being trapezoidal, the smaller base of which forms the inner periphery and the larger base the outer periphery. The helical member 13 has on its outer periphery a groove 14 which facilitates the flow of lubricant coming from the chamber 10 into the stuffing box through perforations 15 provided in the sections of the stuffing box. The helical member has radial perforations 16 which convey the oil from the groove to the inner periphery of the thread.

Between the thread of the helical member 13 a packing member 17 is wound on the shaft 9. Due to the fact that the facing sides of the thread diverge toward the axis of the helical member, the packing member 17 when compressed by the movement of the threads toward one another, will tend to move radially and engage tightly the shaft 9 while the threads of the helical member will be caused by the same movement to move away from the axis and therefore engage tightly the stuffing box 6, compression of the helical member and the packing member being controlled by a packing gland 18 secured in the well known way to the extension 5 of the cylinder head 4. The flange of the sections of the stuffing box 6 is preferably provided with screws 19 for equalizing the strain at the open end of the stuffing box.

The reason for employing a removable stuffing box formed of semi-cylindrical sections is to facilitate the stripping of and repacking, but it is self evident that the helical member, and packing wound therebetween, can be employed as well in the ordinary stationary type of stuffing boxes.

Having thus described our invention, what we claim as new and desire to secure by Letters Patent is:

1. In a packing of the class described, a helical packing member, a helical supporting member for said packing member having in cross section the shape of a trapezoid, the parallel sides of which are parallel to the axis of the supporting member, the shorter parallel side of said trapezoid being nearer to the axis of said supporting member, said helical supporting member having a groove on the larger parallel side of the trapezoid, and radial perforations from the groove.

2. In a packing of the class described, a helical member the coil of which has in cross section the shape of a trapezoid, the parallel sides of which are disposed parallel to the axis of the helical member, the smaller parallel side of which forms the inner periphery of the helical member, said helical member having a groove on the outer periphery and radiating perforations through the coil, a packing member between the coil of the helical member, and a stuffing box having an oil chamber in its periphery and provided with apertures leading from the chamber through the same.

3. A packing of the class described comprising a flanged tubular member, two semi-cylindrical sections fitting in the tubular member and having flanges at their ends, the sections being reduced between their ends to form with the tubular member an oil chamber and provided with apertures in the reduced portion, a helical member having radial apertures, a packing between the coils of the helical member, a packing gland extending into the semi-cylindrical sections and engaging the packing, and means for adjustably securing the gland to the tubular member.

LOUIS J. FARLAND.
LOUIS F. ROBERT.

Witnesses:
  VICTOR K. MOORE,
  ALVIN E. BURT.